Dec. 14, 1954     P. C. KUEHN     2,696,898
CENTRIFUGALLY ENGAGED FRICTION CLUTCH
Filed July 25, 1949
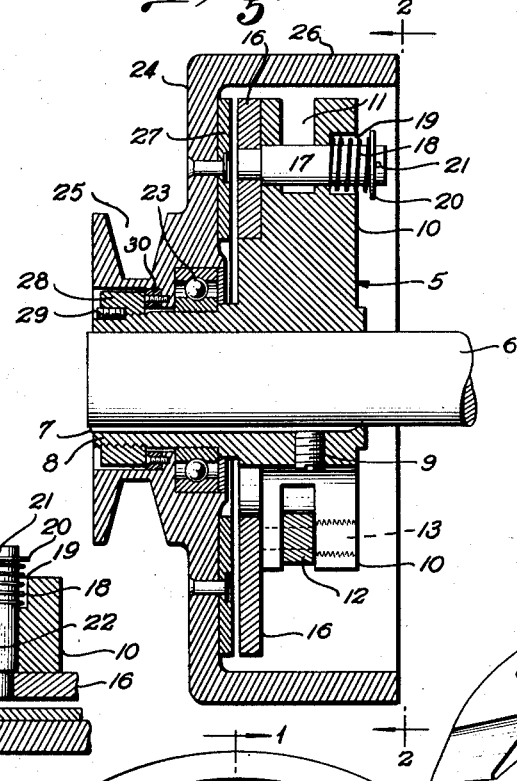
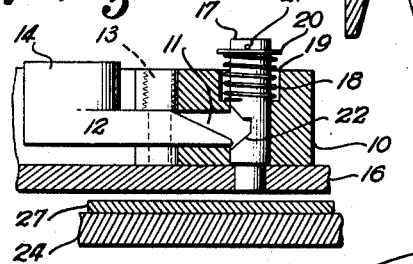
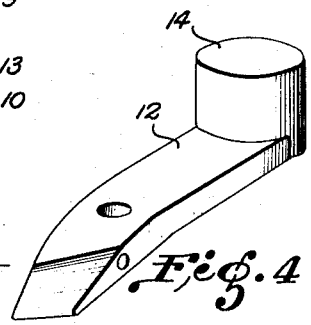
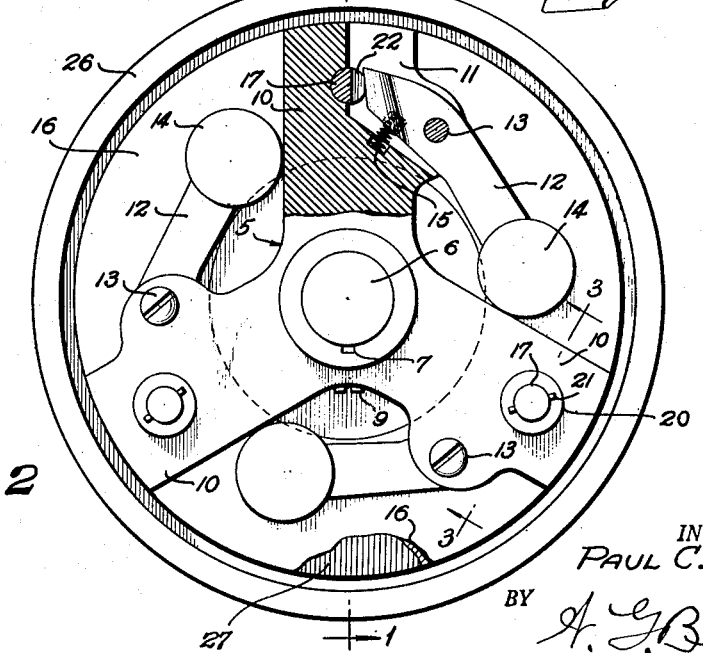
INVENTOR.
PAUL C. KUEHN
BY
ATTORNEY

United States Patent Office 2,696,898
Patented Dec. 14, 1954

2,696,898

CENTRIFUGALLY ENGAGED FRICTION CLUTCH

Paul C. Kuehn, Kendallville, Ind.

Application July 25, 1949, Serial No. 106,547

7 Claims. (Cl. 192—105)

This invention relates to improvements in a centrifugally engaged friction clutch mechanism adaptable for transmitting power from the engine to the traction wheel of a motor-cycle or the like.

Generally, mechanisms devised for similar purposes, have a complication of parts that are difficult to make and assemble which involves considerable expense in their manufacture and installation in the vehicle to which they are applied.

An object of the instant invention is to construct an automatic friction clutch mechanism the parts of which are few, and so designed as to be produced by exercise of simple methods of manufacture, and which may readily be assembled economically.

Another object of the invention is to provide a simple clutch mechanism the parts of which by exercise of ordinary skill are easily disassembled when replacements or repairs are required.

And a further object of the invention is to provide a dependable automatically-operated friction clutch that is manufactured at low cost.

Other objects and advantages of the invention appear in the following description.

An illustrative embodiment of the invention is shown in the accompanying drawings, in which:

Fig. 1 is a side elevational view of a clutch in which the invention is incorporated, in section on the line 1—1 of Fig. 2, and showing the general arrangement of parts;

Fig. 2 is an end elevational view of the structure shown in Fig. 1, portions being broken away and in section;

Fig. 3 is a fragmentary elevational view partly in section on the line 3—3 of Fig. 2; and Fig. 4 is a perspective view of one of the fly-levers used in the structure.

The illustrative embodiment of the invention consists of a drive-head 5 that is secured upon the drive-shaft 6 of a motor (not shown), there being a key 7 by which the hub 8 of the drive-head is secured upon the shaft to prevent relative rotation with respect to the drive-head and the shaft. A set-screw 9 threaded in the hub bears against the key by which axial movement of the hub on the shaft is prevented. The drive-head 5 has equally spaced radially extending arms 10, the outer end portions of which are provided with open slots 11 into which extend corresponding fly-levers 12 that are secured in operative position by individual pivots 13. Preferably, the outer ends of the fly-levers are provided with corresponding weights 14 that, when the clutch is out of action, normally bear against an arm of the drive-head next adjacent the arm in which the corresponding fly-lever is pivoted and thus serving as a stop by which inward swinging movement of said fly-levers are limited. The fly-levers are urged into normal position by means of springs 15, located in the arms 10, and which bear outwardly against the inner end portions of the fly-levers.

Upon the inner face of the drive-head 5, concentric therewith, is disposed an annulus constituting a clutch-plate 16 which is provided with a series of studs 17 secured thereto that extend loosely through the corresponding arms 10, and are partially exposed in the slots 11 therein. Each stud has disposed about its outer end portion a compression spring 18 one end of which is seated in a socket 19 in the front of the corresponding arm 10, the opposite end of the spring being held in place on the stud by a washer 20 and a cotter-pin 21. By this arrangement the clutch-plate is normally held out of action by the springs 18.

Each stud 17 is provided with a cam face 22 that is engageable by the inner end of the corresponding fly-lever 12, so that when the fly-levers swing outwardly the studs 17 thereby are moved inwardly whereby the clutch-plate 16 is moved accordingly in opposition to restraint of the springs 18.

Upon a ball bearing 23 that encompasses the hub 8 of the drive-head, is mounted a driven member 24 that normally has free rotative movement relative to the drive-head. The hub of the driven member has an annular groove 25 for the reception of a belt (not shown) and is provided with a forwardly extending annular flange constituting a housing 26 that encompasses the drive-head to afford a shelter therefor. Upon the inner face of the drive member is secured a friction facing 27 that is engaged by the clutch-plate 16, when activated upon outward swinging movement of the fly-levers, thus causing rotation of the driven member together with the drive-head while the latter is in operation.

Preferably, there is provided a thrust bearing 28 extending loosely into the driven member, threaded on the hub of the drive-head and secured in adjusted position thereon by a key-screw 29. The inner end of the thrust bearing 28 rests against a washer 30 secured in the driven member so that outward axial movement of the driven member on the hub of the drive-head is prevented.

In utilizing the invention the drive-shaft extends from the motor, and the driven member is connected with the traction wheel of the vehicle in the usual manner, so that when the motor is activated at a speed sufficiently high as to cause outward spread of the fly-levers by centrifugal force developed more or less forcefully, dependent upon the speed of the drive-head, the clutch-plate becomes pressed with corresponding force against the friction facing 27, thus causing rotation of the driven member and consequent travel of the traction wheel of the vehicle, through the medium of the belt, previously referred to. Upon reduction of the motor's speed the pressure of the clutch-plate against the friction facing in the driven member is correspondingly lessened or disappears entirely whereupon the clutch mechanism becomes idle. In this manner the driven member is engaged or disengaged automatically by the clutch-plate as the speed of the drive-head is accelerated beyond a predetermined velocity or is reduced to a speed below such velocity.

A feature of the invention is that the pressure of the clutch-plate against the friction facing is increased directly as the velocity of the drive-head is accelerated and inversely as its speed is reduced, whereby the effectiveness in transmission of power from the drive-head to the driven member is correspondingly varied.

Variations from the particular construction above disclosed may be resorted to by the exercise of skill in the art, without departure from the spirit or scope of the invention.

What I claim is:

1. A clutch adapted for use with a drive shaft comprising: a drive head fixedly mounted on said drive shaft, a clutch plate embracing said shaft and mounted on said drive head for rotation in unison therewith; a plurality of studs secured at one end to said clutch plate and slidably projected through said drive head for mounting said clutch plate on said drive head for axial movement relatively thereto; a spring on each of said studs normally resisting movement of said clutch plate axially away from said drive head; a hub on said drive head; a clutch housing rotatably mounted on said hub; a clutch plate in said housing engageable with said first mentioned clutch plate; a lever swingably mounted on said head adjacent each of said studs, each of said studs having a notch formed intermediate its ends to form a cam surface and one end of said lever being swingable into said notch for moving said studs axially and forcing said clutch plates into engagement.

2. A clutch adapted for use with a drive shaft, comprising: a drive head fixedly mounted on said drive shaft; a clutch plate embracing said shaft and mounted on said drive head for rotation in unison therewith; a plurality of studs secured at one end to said clutch plate and slidably projected through said drive head for mounting said clutch plate on said drive head for axial movement relatively thereto; a spring on each of said studs normally resisting movement of said clutch plate axially away from said drive head; a hub on said drive head; a clutch housing rotatably mounted on said hub; a clutch plate in said housing, engageable with said first mentioned clutch plate; a lever swingably mounted on said head adjacent each of said studs, each of said studs having a notch formed intermediate its ends to form a cam surface and one end of said lever being swingable into said notch for moving said studs axially and bringing said clutch plates into engagement; and a spring for normally urging the ends of said swing levers out of said notch.

3. A clutch mechanism adapted for use with a rotating drive shaft, comprising: a drive head fixedly mounted on said drive shaft; a hub projecting centrally outwardly from one side of said drive head and embracing said drive shaft; a plurality of spaced arms radiating outwardly from said drive head; each of said spaced arms having a radial slot formed therein between the sides thereof and extending inwardly from the periphery thereof; a stud projecting through each of said arms and spanning the slot therein; a clutch plate mounted on the end of each of said studs and movable axially of said drive head and rotated in unison therewith; a spring on each of said studs normally resisting axial movement of said clutch plate in one direction; a clutch housing rotatably mounted on said hub; a clutch plate in said housing engageable with said first mentioned clutch plate on axial movement of same in one direction a predetermined distance against the compression of said springs; a swing lever mounted on each of said arms and swingable in one direction in response to centrifugal action; and a cam surface formed on each of said studs intermediate its ends at the location of said slot for reception of the end of a swing lever upon swinging of same in one direction for moving said first named clutch plate axially of said head into engagement with said second named clutch plate.

4. A clutch mechanism adapted for use with a rotating drive shaft, comprising: a drive head fixedly mounted on said drive shaft; a hub projecting centrally outwardly from one side of said drive head and embracing said drive shaft; a plurality of spaced arms radiating outwardly from said drive head; each of said spaced arms having a radial slot formed therein between the sides thereof and extending inwardly from the periphery thereof; a stud projecting through each of said arms and spanning the slot therein; a clutch plate mounted on the end of each of said studs and movable axially of said drive head and rotating in unison therewith; a spring on each of said studs normally resisting axial movement of said clutch plate in one direction; a clutch housing rotatably mounted on said hub; a clutch plate in said housing engageable with said first mentioned clutch plate on axial movement of same in one direction a predetermined distance against the compression of said spring; a swing lever mounted on each of said arms and swingable in one direction in response to centrifugal action; and a cam surface formed on each of said studs intermediate its ends at the location of said slot for reception of the end of a swing lever upon swinging of same in one direction for moving said first named clutch plate axially of said head into engagement with said second named clutch plate; and a spring for normally retaining said swinging arms moved to a position out of engagement with said cam surface.

5. A clutch adapted for use with the drive shaft comprising: a drive head fixedly mounted on said drive shaft; a clutch plate embracing said shaft and mounted on said drive head for rotation in unison therewith; a plurality of studs secured at one end to said clutch plate and slideably projected through said drive head for mounting said clutch plate on said drive head for axial movement relatively thereto; a spring on each of said studs normally resisting the movement of said clutch plate axially away from said drive head; a hub on said drive head; a clutch plate rotatably mounted on said head and engageable with said first mentioned clutch plate for, upon engagement therewith, rotating in unison therewith; a lever swingably mounted on said head adjacent each of said studs, each of said studs having a notch formed intermediate its ends, one side of said notch being inclined to the axis of the said stud to form a cam surface and one end of said lever being swingable into said notch, whereby when said lever moves over said cam surface said studs are moved axially to move said clutch plates into engagement.

6. A clutch adapted for use with a drive shaft comprising; a drive head fixedly mounted on said drive shaft; a clutch plate embracing said shaft and mounted on said drive head for rotation in unison therewith; a hub on said drive head; a clutch housing rotatably mounted on said hub; a clutch plate in said housing, in fixed relation thereto, and engageable with said first mentioned clutch plate; resilient means normally retaining said clutch plates in spaced-apart relation; a lever swingably mounted on said head adjacent each of said studs, each of said studs having a notch formed intermediate its ends and provided with an end surface inclined to the axis of the stud to provide a cam surface and one end of said lever being swingable into said notch for riding over said cam surface and moving said studs axially and moving said clutch plates into engagement.

7. A clutch adapted for use with a drive shaft comprising; a drive head fixedly mounted on said drive shaft; a clutch plate embracing said shaft and mounted on said drive head for rotation in unison therewith; a hub on said drive head; a clutch housing rotatably mounted on said hub; a clutch plate in said housing, in fixed relation thereto, and engageable with said first mentioned clutch plate; resilient means normally retaining said clutch plates in spaced-apart relation; a lever swingably mounted on said head adjacent each of said studs, each of said studs having a notch formed intermediate its ends and provided with an end surface inclined to the axis of the stud to provide a cam surface and one end of said lever being swingable into said notch for riding over said cam surface and moving said studs axially and moving said clutch plates into engagement, for rotation in unison therewith, said movement of said clutch plates into engagement being against the pressure of said resilient means.

References Cited in the file of this patent

UNITED STATES PATENTS

| Number | Name | Date |
|---|---|---|
| 1,503,818 | Crane | Aug. 5, 1924 |
| 1,670,877 | Bruckmann | Aug. 19, 1925 |
| 1,718,105 | Benn | June 18, 1929 |
| 1,990,614 | Robertson et al. | Feb. 12, 1935 |
| 2,107,075 | Lyman | Feb. 1, 1938 |
| 2,491,003 | Elmore | Dec. 13, 1949 |